F. W. & E. P. GROSS.
LEVELING DEVICE FOR THRESHING MACHINES.
APPLICATION FILED OCT. 2, 1908.
919,854.
Patented Apr. 27, 1909.
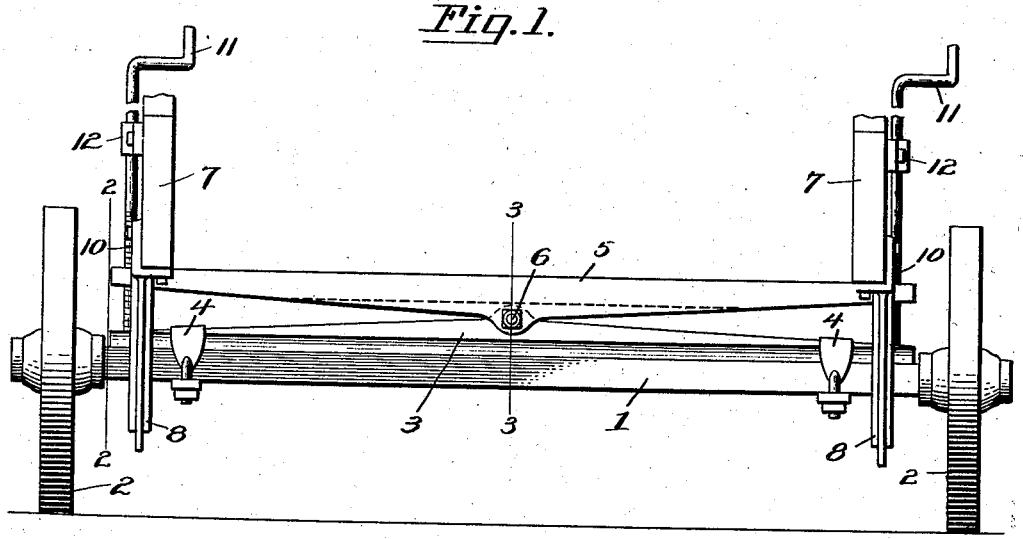
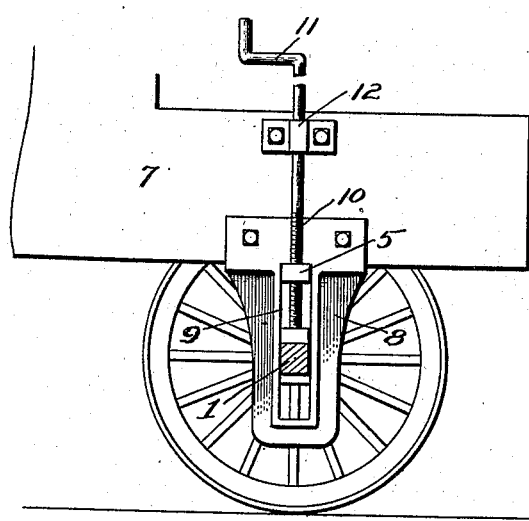
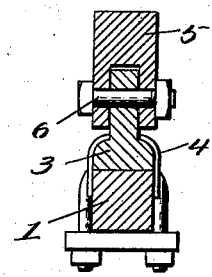
Witnesses
F. C. Gibson.
C. Bradway.
Inventors
Fred W. Gross.
Edwin P. Gross.
By Victor J. Evans
Attorney

UNITED STATES PATENT OFFICE.

FRED W. GROSS AND EDWIN P. GROSS, OF DECORAH, IOWA.

LEVELING DEVICE FOR THRESHING-MACHINES.

No. 919,854.       Specification of Letters Patent.       Patented April 27, 1909.

Application filed October 2, 1908. Serial No. 455,797.

*To all whom it may concern:*

Be it known that we, FRED W. GROSS and EDWIN P. GROSS, citizens of the United States, residing at Decorah, in the county of Winneshiek and State of Iowa, have invented new and useful Improvements in Leveling Devices for Threshing-Machines, of which the following is a specification.

This invention relates to threshing machines and more particularly to a leveling device whereby the separator can be leveled when the threshing machine is on an incline, as for instance, a hillside.

The invention has for one of its objects to improve and simplify the construction and operation of devices of this character so as to be comparatively simple and inexpensive to manufacture, readily manipulated, and efficient in use.

Another object of the invention is the provision of an oscillatory bar pivotally mounted on an axle of the threshing machine and on which the separator rests, and at the ends of the bar are screws mounted on the separator which are threaded in the ends of the bar for changing the position of the latter with respect to the axle so that the separator can be leveled irrespective of the position of the axles of the threshing machine.

With these objects in view and others, as will appear as the description proceeds, the invention comprises the various novel features of construction and arrangement of parts which will be more fully described hereinafter and set forth with particularity in the claim appended hereto.

In the accompanying drawing, which illustrates one embodiment of the invention, Figure 1 is an elevation of one of the axles of the threshing machine showing the leveling device thereon. Fig. 2 is a section on line 2—2, Fig. 1. Fig. 3 is a section on line 3—3, Fig. 1, drawn on an enlarged scale.

Similar reference characters are employed to designate corresponding parts throughout the views.

Referring to the drawing, 1 designates one of the axles of the threshing machine which is provided at its ends with transportation wheels 2, and on the top of the axle is a reinforcing bar 3 which is secured in place by clips 4. Disposed above the member 3 is a bar or transverse beam 5 which is connected at its middle with the member 3 by a horizontal pivot 6 that passes through overlapping lugs on the bars 3 and 5 for permitting the bar 5 to tilt in a transverse plane. The sides of the separator are indicated by 7, and on the same are depending frames or yokes 8 provided with vertical slots or guideways 9 through which the axles 1 extend and the ends of the leveling bar 5 project outwardly through the slots or guideways 9. The separator of the threshing machine has its opposite end resting on a leveling bar 5, and extending vertically through and threaded in the extremities of the bars 5 are adjusting screws 10 on rods that extend upwardly along the sides of the separator and are provided at their upper ends with operating cranks. The screw rods turn freely in one or more bearings 12 at the side of the separator and the lower ends of the rods bear on the axle so that by turning either rod in one direction or the other, the leveling bar 5 can be changed with respect to the position of the axle for leveling the separator of the thresher.

From the foregoing description, taken in connection with the accompanying drawing, the advantages of the construction and of the method of operation will be readily apparent to those skilled in the art to which the invention appertains, and while we have described the principle of operation of the invention, together with the device which we now consider to be the best embodiment thereof, we desire to have it understood that the device shown is merely illustrative, and that such changes may be made when desired as are within the scope of the claim appended hereto.

Having thus described the invention, what we claim is:—

In a threshing machine, the combination of a separator, an axle extending thereunder, wheels on the axle, a reinforcing bar on the top of the axle and extending substantially the full length thereof, clips for securing the axle and bar together, a beam disposed over the bar and extending parallel therewith and on which the separator rests, depending frames secured to the separator and provided with vertical guideways through which the axle extends and also through which the extremities of the bar and beam project outwardly, overlapping lugs on the bar and beam, a central pivot passing through the lugs in a direction transverse to the axle for permitting relative tilting movement between the beam and axle, said beam having vertically-disposed threaded apertures in its extremities, vertically-disposed rods having threaded lower ends engaged in the apertures of the beam and arranged with their lower extremities bearing on the top surface of the said bar at the ends thereof, bearings on the side of the separator for rotatably supporting the rods, and means for turning the rods for tilting the beam with respect to the axle.

In testimony whereof we affix our signatures in presence of two witnesses.

FRED W. GROSS.
EDWIN P. GROSS.

Witnesses:
LUTHER REED,
HENRY J. GROSS.